No. 789,815. PATENTED MAY 16, 1905.
F. A. NEIDER.
CLIP FOR SPRINGWORK.
APPLICATION FILED MAY 31, 1904.
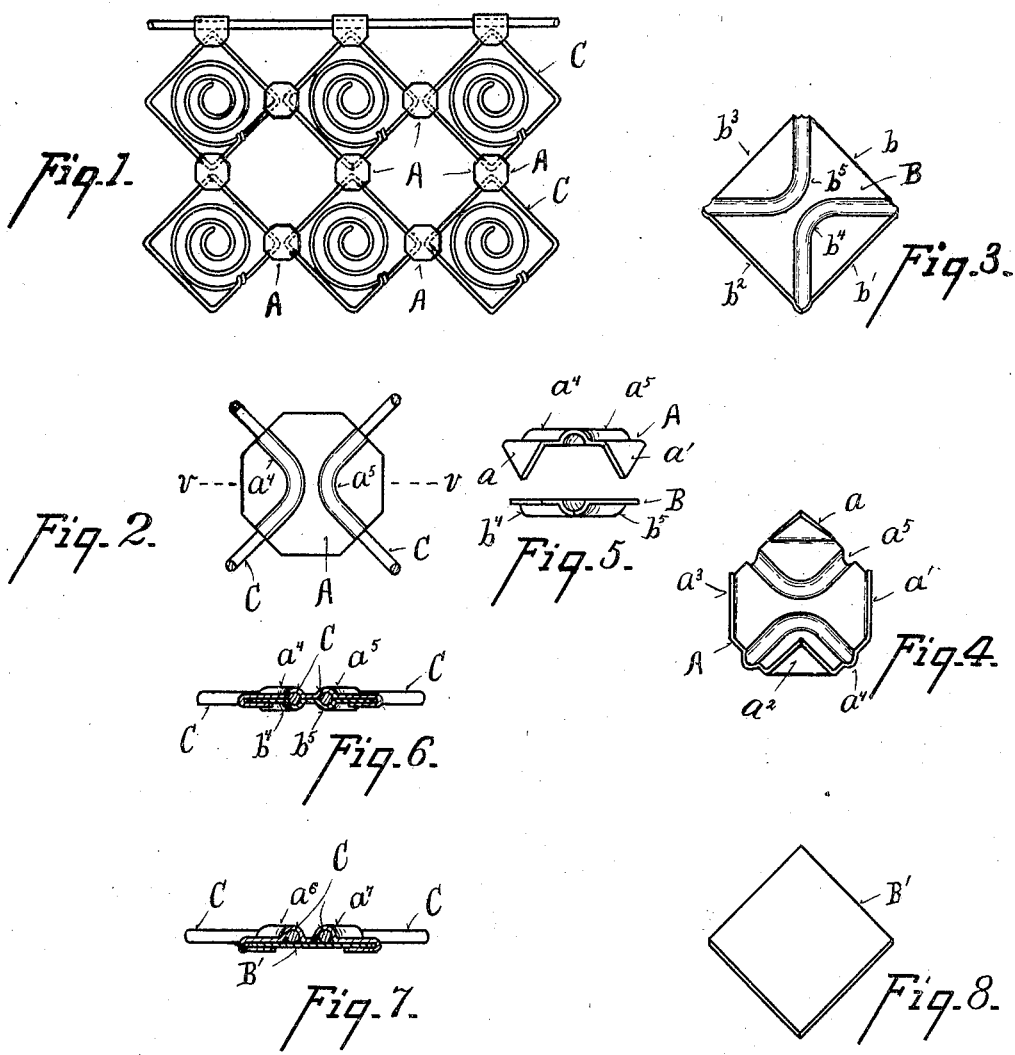
Witnesses
C. W. Miles.
A. McCormack.
Inventor
Fred A. Neider
By Murray & Murray
Attorneys No. 789,815.

Patented May 16, 1905.

UNITED STATES PATENT OFFICE.

FRED A. NEIDER, OF AUGUSTA, KENTUCKY.

CLIP FOR SPRINGWORK.

SPECIFICATION forming part of Letters Patent No. 789,815, dated May 16, 1905.

Application filed May 31, 1904. Serial No. 210,497.

*To all whom it may concern:*

Be it known that I, FRED A. NEIDER, a citizen of the United States of America, and a resident of Augusta, county of Bracken, State of Kentucky, have invented certain new and useful Improvements in Clips for Springwork, of which the following is a specification.

My invention relates to clips especially adapted for holding coiled springs together in springwork without the interposition of tie-rods.

The object of my invention is a clip which holds the coils so that their ends lie in a plane or, in the language of the trade, present "a flat surface," while at the same time giving the desired flexibility to the surface without any accompanying wabbling or slipping of the springs relatively to one another.

In the accompanying drawings I have illustrated a clip embodying my invention as applied to a spring construction wherein the upper coils of the springs are made rectangular.

Referring to the drawings, Figure 1 is a plan view of a section of springwork, showing the clip embodying my invention in use. Fig. 2 is a plan view of the clip embodying my invention. Fig. 3 is a detail plan view of one of the plates. Fig. 4 is a similar view of the other of the plates. Fig. 5 is a side elevation of the plates, showing the manner of inserting one into the other. Fig. 6 is an edge elevation of the plates after they have been secured together. Fig. 7 is a similar view of a slight modification. Fig. 8 is a detail view of one of the plates used in the modified form shown in Fig. 7.

Referring to the parts, the clip embodying my invention consists of two plates A and B, which are designed to fit flat against each other and to have grooves formed in one or other of them which afford ways in which the wires to be secured together are held. In the preferred form plate A is made from a rectangular sheet of metal whose corners are turned up, as shown in Fig. 4, forming tangs $a$ $a'$ $a^2$ $a^3$, and which has two semicircular grooves $a^4$ $a^5$ formed in it, each groove having a right-angled curve in it. Plate B has straight edges $b$ $b'$ $b^2$ $b^3$ to fit against the tangs $a$ to $a^3$ and has semicircular grooves $b^4$ $b^5$ to register with grooves $a^4$ $a^5$ and to form therewith circular ways in which the wires to be held together are seated. The plates are held together by bending the tangs $a$ to $a^3$ down over the plate B. In the form shown in Fig. 7, instead of having the grooves formed in semicircular shape in both plates, I form grooves $a^6$ $a^7$ more nearly approaching the circular form and leaving the plate B' ungrooved.

In Fig. 1 I have shown my clip as applied to a series of coils, whose upper coils C are made rectangular. They are fastened together by placing the corners of one coil adjacent to that of another coil and then of placing one of the plates upon top of the wires with the wire seated in the grooves in plate and of then placing the other plate of the clip upon the under side of the wire with the groove registering likewise with the wires and in then bending the tangs $a$ to $a^3$ downward over the other plate. It is seen then that the tangs $a$ to $a^3$, fitting into the depression between the grooves in the plate B, form a most firm seat to prevent the wire slipping or wabbling. At the same time there is the desired flexibility left between each coil and its adjacent coil.

Instead of forming the ways in one or in both of the plates I can leave both plates flat, place them in position one above the other below the corner to be joined, and then press them down around the wires, the tangs of one plate being bent over the sides of the other plate between the wires, as shown.

What I claim is—

1. A clip for springwork consisting of two plates adapted to fit flat against each other, ways formed between the plates for the reception of wires, and tangs formed integral with a plate, and projecting over and bent down upon the other plate leaving between the tangs openings registering with the ways.

2. An angle-plate having its corners bent into tangs, leaving openings between the tangs for the passage of wires, a second plate to rest against the first plate and to be secured thereto by the bending of the tangs, one or both plates being grooved to form ways for the reception of wires.

3. A rectangular plate having its corners turned up to form tangs, a second plate to lie flat against the first plate and between the tangs thereof, one or both plates being grooved to form ways for the reception of wires, the grooves registering with the spaces between the tangs.

4. A rectangular plate having its corners bent up to form tangs and having grooves formed therein, a second plate to lie flat against the first plate and having straight edges to contact the tangs and grooves registering with the grooves in the first plate to form ways for the reception of wires to be held together.

FRED A. NEIDER.

Witnesses:
W. F. MURRAY,
A. McCORMACK.